United States Patent [19]
Kobayashi et al.

[11] Patent Number: 4,804,246

[45] Date of Patent: Feb. 14, 1989

[54] LIGHT-TRANSMITTING FIBER OF GLASS CORE AND CLAD OF CURED COPOLYMER OF FLUOROOLEFIN AND ALKYL ETHER

[75] Inventors: Shigeyoshi Kobayashi, Kawasaki; Seiji Munekata, Tokyo; Masao Unoki, Yokohama; Toshio Iwamoto, Tokyo, all of Japan

[73] Assignee: Asahi Glass Company Ltd., Tokyo, Japan

[21] Appl. No.: 32,468

[22] Filed: Mar. 31, 1987

[30] Foreign Application Priority Data

Apr. 3, 1986 [JP] Japan .................................. 61-75620

[51] Int. Cl.$^4$ ............................................... G02B 6/16
[52] U.S. Cl. .................................. 350/96.34; 524/315; 525/123; 525/200; 526/247; 526/249
[58] Field of Search ............... 350/96.34, 96.29, 96.30; 525/123, 200; 526/247, 249; 524/315

[56] References Cited

U.S. PATENT DOCUMENTS

| | | | |
|---|---|---|---|
| 4,511,209 | 4/1985 | Skutnik | 350/96.34 |
| 4,529,785 | 7/1985 | Ohmori et al. | 526/247 |
| 4,588,781 | 5/1986 | Ohmori et al. | 525/200 |
| 4,622,364 | 11/1986 | Ohmori et al. | 525/200 |
| 4,640,966 | 2/1987 | Mitani et al. | 526/249 |
| 4,690,968 | 9/1987 | Mitani et al. | 525/123 X |

FOREIGN PATENT DOCUMENTS

| | | |
|---|---|---|
| 2227213 | 12/1972 | Fed. Rep. of Germany . |
| 2924495 | 1/1981 | Fed. Rep. of Germany . |
| 56-62206 | 5/1981 | Japan . |

OTHER PUBLICATIONS

Patent Abstracts of Japan, vol. 10, No. 198, (P-476) [2254], Jul. 11, 1986.
Chemical Abstracts, vol. 102, No. 6, Feb. 1985, p. 258, Abstract No. 49950y.

*Primary Examiner*—John D. Lee
*Attorney, Agent, or Firm*—Oblon, Fisher, Spivak, McClelland & Maier

[57] ABSTRACT

A plastic-clad light-transmitting fiber consisting essentially of a core of quartz glass or optical glass and a clad of plastic material, characterized in that said clad of plastic material is a cured body of a solvent-soluble fluoroolefin polymer having curable sites.

9 Claims, No Drawings

LIGHT-TRANSMITTING FIBER OF GLASS CORE AND CLAD OF CURED COPOLYMER OF FLUOROOLEFIN AND ALKYL ETHER

The present invention relates to a plastic-clad light-transmitting fiber having a low transmission attenuation and improved properties such as excellent water-resistance.

A plastic-clad light-transmitting fiber (hereinafter referred to simply as PCF) has been known which consists essentially of a core of quartz glass or optical glass and a clad of plastic material. Such PCF has a high NA (numerial aperture) and a low transmission attenuation, and thus is expected to be used in various fields, for example, for optical communication, for image-transmission, and for light-guide.

The refractive index of PCF can be changed by changing the type of the plastic material used for the clad. Therefore, PCF having various NA can be obtained. In a case where the core is made of high purity quartz glass, the refractive index is small at a level of 1.458, and accordingly, the plastic material for the clad is required to be selected from those having refractive indices lower than that level. Besides, the clad material is required to satisfy such conditions as (a) colorless and transparent, (b) excellent adhesion to the core and (c) excellent clad-forming properties. Accordingly, the range for selection is extremely narrow.

As a clad material satisfying the above conditions, dimethyl silicone or fluorine-containing resin may be mentioned. Further, PCF wherein dimethyl silicone is used, is known, and such PCF is practically widely used. Further, as regards a fluororesin as the clad material, there have been proposed PCF wherein a tetrafluoroethylene-hexafluoropropylene copolymer is used (Japanese Examined Patent Publication No. 2566/1973), PCF wherein a tetrafluoroethylene-vinylidene fluoride copolymer is used (Japanese Unexamined Patent Publication No. 52849/1976), PCF wherein an elastomeric cross-linked polyfluorosiloxane is used (Japanese Unexamined Patent Publication No. 62206/1981), and PCF wherein a composition comprising (1) a highly fluorinated monofunctional acrylate, (2) a trifunctional or higher acrylate that serves as a cross-linking agent, (3) a mono or poly-functional thiol that functions as a synergist and (4) a photoinitiator, is used (U.S. Pat. No. 4,511,209.

The silicone PCF therein dimethyl silicone is used as the clad material as mentioned above, may satisfy the optical properties. However, the strength of silicone is poor at a level of from 3 to 40 kg/cm$^2$, and the hardness is low at a level of JIS A20-80, whereby the connection to a connector tends to be difficult. Especially when an adhesive is used for the connection to the connector, there will be a problem such that in a heat cycle test within a range of from −20° C. to +80° C., a stress is created at the interface of the core quartz glass and the clad material due to the difference in the expansion coefficient between the quartz glass and the clad material, whereby the forward end of the core-clad structured fiber is likely to cause pistoning. Further, as its inherent nature, the silicone resin has a relatively large moisture-permeation coefficient. When the silicone PCF is placed in a high temperature and high humidity environment, the moisture readily penetrates through the silicone to the interface of the core and the clad, whereby the growth of a micro crack on the core surface will be facilitated, and the fiber strength will be reduced.

On the other hand, the fluororesin PCF wherein a fluororesin is employed as the clad material, has a high strength, and is not susceptible to the above-mentioned undesirable phenomenon of the pistoning from the connector. However, a product having an excellent transmission property as an optical property has not yet been available. This is primarily due to the poor adhesion of the core quartz glass with the fluororesin. Namely, fluororesins are usually hardly soluble in solvents, and it is common to apply the fluororesin to the core by extrusion molding rather than by solution-type coating materials. This is the main cause for the poor adhesion, whereby the transmission loss will be substantial. The fluororesin can be dissolved in a certain solvent, but the solubility is still as low as from 10 to 20% by weight. Therefore, it is not easy to control the viscosity and the boiling point of the solution, and it is hardly possible to apply it in the form of a coating solution.

Further, the fluororesin PCF has an additional problem that the strength has not been adequate for practical applications. Namely, in the strength test of a sample having a short length for experimental purpose, it shows a strength of from 500 to 600 kg/mm$^2$ which is substantially equal to the strength of PCF wherein silicone is used as the clad, but, in the tensile test of a sample having a length of e.g. about 10 m, the breaking strength is at a level of from 200 to 300 kg/mm$^2$, and a substantial variation is observed in the strength. Thus, the fluororesin PCF has a problem in the mechanical strength from the viewpoint of the practical reliability for use for a long period of time.

The present inventors have conducted extensive researches and studies to solve such conventional problems, and as a result, have found a certain solvent-soluble fluorine-containing polymer, and they have found it possible to solve the above problems by forming on a core a clad layer of a cured product of a composition containing the polymer or of such a composition which further contains a surfactant and/or a silane coupling agent.

The present invention has been accomplished on the basis of such discoveries, and it is an object of the present invention to provide a plastic-clad light-transmitting fiber, which has a low transmission loss and excellent moisture resistance, water resistance and strength and which is hardly susceptible to the pistoning from the connector.

The present invention provides a plastic-clad light-transmitting fiber consisting essentially of a core of quartz glass or optical glass and a clad of plastic material, characterized in that said clad of plastic material is a cured product obtained by curing a solvent-soluble fluoroolefin polymer having curable sites and containing at least 10% by weight of fluorine based on the fluoroolefin units.

Now, the present invention will be described in detail with reference to the preferred embodiments.

The solvent-soluble fluoroolefin polymer having curable sites to be used in the present invention, may be of an addition polymer type or of a condensation polymer type. In the present invention, it is important to use a fluoroolefin polymer containing at least 10% by weight of fluorine atoms based on the fluoroolefin units and having good compatibility or solubility to curing agents and usual solvents. If the fluorine content is too small, the merit as a clad diminishes. On the other hand, even if a fluoropolymer contains at least 10% by weight fluorine, it is not suitable for use if it is insoluble in various solvents. The fluorine content in the fluoroolefin polymer to be used in the present invention is usually selected within a range of from 10 to 70% by weight, preferably from 15 to 50% by weight. As the fluorine-containing polymer of the addition polymer type, an addition polymer or addition copolymer of a fluorine-containing unsaturated compound may be mentioned which contains curing sites such as hydroxyl groups, epoxy groups, carboxyl groups, acid amide groups, ester groups, unsaturated bonds, active hydrogen atoms or halogen atoms. As the fluorine-containing polymer of the condensation polymer type, an epoxy resin having a fluorine-containing bi-functional group or a condensation product of a fluoroolefin-containing diol, dibasic acid, dibasic acid anhydride or diisocyanate may be mentioned, which contains ester bonds, urethane bonds or urea bonds.

From the viewpoint of the adhesion with the core quartz glass, the strength and hardness as the clad or the availability, a fluoroolefin polymer of an addition polymer type such as a copolymer of a fluoroolefin with a vinyl ether is preferred. Such a fluoroolefin-vinyl ether copolymer preferably comprises from 30 to 70 mol % of the fluoroolefin unit and from 30 to 70 mol % of the vinyl ether unit, and preferably has an intrinsic viscosity $[\eta]$ of from 0.06 to 2.0 dl/g as measured at 30° C. in tetrahydrofuran in a non-cured state. Further, it preferably contains not more than 30 mol % of a hydroxyl group-containing vinyl ether or glycidyl vinyl ether unit.

As the fluoroolefin component, tetrafluoroethylene, chlorotrifluoroethylene and a mixture thereof are suitable. As the vinyl ether component, an alkyl vinyl ether having a straight chain, branched or cyclic alkyl group having from 2 to 8 carbon atoms, is suitable. For instance, cyclohexyl vinyl ether, ethyl vinyl ether and n-butyl vinyl ether may be mentioned. Further, for the purpose of reducing the refractive index, a fluorine-containing vinyl ether may also be mentioned as a preferred example.

Further, such a copolymer preferably contains a comonomer component which provides curable sites. As such a comonomer which provides curable sites, a hydroxyl group-containing alkyl vinyl ether such as ω-hydroxybutyl vinyl ether or hydroxypropyl vinyl ether, or a functional group-containing vinyl ether such as glycidyl vinyl ether, is suitable.

The copolymer may further contain, if necessary, other vinyl monomers copolymerizable with the above-mentioned copolymer components, such as an acrylate, a methacrylate, an alkyl vinyl ester, styrene or a fluorine-substituted derivative thereof.

The above-mentioned copolymer can be produced by applying a polymerization initiator or a polymerization initiating source such as an ionized radiation to the mixture of monomers in the predetermined proportions in the presence or absence of a polymerization medium to conduct the copolymerization reaction.

The fluoroolefin polymer having curable sites thus produced, is soluble in a solvent, and it is dissolved in a solvent to obtain a coating composition for cladding, which is then coated on the core of quartz glass, and cross-linked and cured to form a cured body as a clad. The solvent used for this purpose, includes a ketone such as methyl ethyl ketone or methyl isobutyl ketone, an ester such as ethyl acetate or butyl acetate, an aromatic compound such as toluene or xylene, and an aliphatic hydrocarbon compound such as octane or hexane. These solvents may suitably be used in combination.

When the fluoroolefin polymer is dissolved in a solvent to prepare a coating composition for cladding, a curing agent of a polyfunctional compound having a reactivity with the curable sites of the fluoroolefin polymer, may be incorporated in an amount of from 0.1 to 100 parts by weight, preferably from 0.5 to 50 parts by weight, relative to 100 parts by weight of the fluorine-containing polymer. Of course, such a curing agent may not be incorporated. Further, a curing assistant or a curing catalyst may optionally be incorporated as the case requires. In a case where a room temperature curable composition for cladding is prepared by using a fluorine containing polymer having hydroxyl groups as the curable sites, a polyisocyanate or a metal alkoxide may be employed as the curing agent. When this composition for cladding is to be made into a heat-curable type, a melamine curing agent, a urea resin-curing agent or a polybasic acid-curing agent which is commonly used for a usual thermosetting acrylic coating composition, may be used as the curing agent.

As the melamine curing agent, butylated melamine, methylated melamine or epoxy-modified melamine may be mentioned. Various levels of modification of from 0 to 6 may be used depending upon the particular purpose, and the degree of self-condensation may suitably be selected. As the urea resin-curing agent, methylated urea or butylated urea may be used. As the polybasic acid-curing agent, a long chain fatty acid dicarboxylic acid, an aromatic polybasic carboxylic acid or its anhydride or a blocked polyisocyanate may be employed. When such a melamine curing agent or urea type curing agent is used, the curing may be facilitated by an addition of an acid catalyst.

When the cladding composition is prepared by using a fluoroolefin polymer having epoxy groups as curable sites, an amine, a carboxylic acid, a phenol or an alcohol may be used as the curing agent. In such a case, a polyhydroxyl compound, particularly a non-aromatic diol, may be used as a curing assistant.

In the present invention, the above cladding composition may be formed into a clad layer directly on the core quartz glass or optical glass. Thus, in the plastic-clad light-transmitting fiber, the clad layer plays not only a role to optically seal a light in the core, but also a role as a protective layer for the light-transmitting fiber. Therefore, it is important that the clad layer maintains its function as a protective layer.

When the fluoroolefin polymer in the form of a solution of the cladding composition is inferior in the wettability to the core glass, micro cracks or defects on the surface of the core are hardly wetted or filled with the cladding composition. Consequently, the rupture of the fiber starts from such portions, whereby the mechanical strength deteriorates. Thus, the wettability or affinity of the cladding composition in the form of a coating solution to the core glass contributes substantially to the improvement of the mechanical strength, and accordingly, an improvement of such properties is desired.

Accordingly, the cladding composition preferably contains a surfactant and/or a silane coupling agent in addition to the fluoroolefin polymer in the form of a solution.

There is no particular restriction as to the surfactant or the silane coupling agent to be incorporated, so long as it improves the wettability of the cladding composition to the core glass. However, when the optical properties as a clad layer of the fluoroolefin polymer is taken into account, it preferably has a low refractive index and is colorless and transparent. Besides, it must have compatibility with the fluoroolefin polymer in the form of a solution. From the experimental experience, the cladding composition preferably has a contact angle of lower than 40° relative to the glass. As a surfactant which satisfies such requirements, a silicone type surfactant and a fluorine type surfactant may be mentioned. The silicone surfactant has Si in the main chain of the molecule. Various kinds of silicone surfactants are known and commercially available, such as ionic surfactants, non-ionic surfactants and polymers. Any one of such surfactants may be used so long as it satisfies the above requirements. The fluorine type surfactant is the one obtained by substituting a part or all of the hydrogen atoms attached to a carbon atom of a hydrophobic group of a usual surfactant with fluorine atoms, and it may be suitably selected from commercial products as in the case of the silicone type surfactant. The surfactant is preferably incorporated in an amount of from 0.01 to 1% by weight in the coating composition for cladding in the form of a solution comprising the fluoroolefin polymer and the solvent. The effect of the surfactant is obtainable even when the amount is less than 0.01% by weight. However, if the amount exceeds 1% by weight, the effect tends to decrease. Therefore, the amount is preferably from 0.05 to 0.5% by weight.

Instead of or in addition to the surfactant, a silane coupling agent may be incorporated in the cladding composition. As such a silane coupling agent, any conventional or commercially available silane coupling agent may be used so long as it is capable of being bonded to the core glass and the fluorine-containing polymer. For example, vinyl triethoxy silane, vinyl trimethoxy silane, γ-aminopropyl triethoxy silane or γ-mercapto tripropylmethoxy silane may be used. The silane coupling agent preferably has a low refractive index and is colorless and transparent when the role as the clad layer is taken into consideration. An adequate effect is observed when the amount is from 0.1 to 10% by weight in the cladding composition. However, the preferred range is from 1 to 5% by weight.

In the present invention, when the core is made of quartz glass, the refractive index of the clad is required to be not higher than 1.45, preferably not higher than 1.44.

It is possible to obtain PCF having any desired NA by changing the refractive index of the clad appropriately. Further, the fluorine content can be controlled by selecting the fluoroolefin polymer, whereby it is possible to produce various PCF having different NA.

In the present invention, a thickness of from 5 to 30 μm is sufficient for the thickness of the clad layer formed on the core of quartz glass or optical glass. However, the thickness is preferably from about 10 to about 50 μm so that it is useful as a protective layer.

In general, as the thickness of the clad layer increases, the stress to the core increases due to a strain in the clad layer, and the fiber tends to undergo bending, thus leading to an increase of transmission attenuation. Particularly when the fiber is cooled to a low temperature of from −40° C. to −50° C., the clad undergoes a greater shrinkage than the quartz glass core, whereby the fiber bends and the transmission attenuation increases. Therefore, the thickness of the clad layer is preferably at most 20 μm, more preferably at most 15 μm. The most suitable construction of the fiber is, therefore, such that the clad layer has a thickness of at most 15 μm and a cushioning layer is provided thereon to protect the fiber from an external stress. The thickness of the clad layer can readily be varied by changing the proportions of the resin solid content and the solvent in the cladding composition. For instance, the thickness of the clad layer can readily be controlled to a level of from 5 to 10 μm by adjusting the solid content to from 10 to 30% by weight. This is advantageous also from the desirability of forming a thin clad layer. The cushioning layer is preferably made of a flexible elastic material such as silicone or urethane. The thickness of the cushioning layer is not critical, but preferably within a range of from 20 to 100 μm. A protective layer may further be provided on the cushioning layer. There is no particular restriction as to such a protective layer. It may be made of a material commonly employed as a protective layer, such as nylon, urethane, a fluororesin such as an ethylene-tetrafluoroethylene copolymer or liquid crystal polymer. The thickness of the protective layer may be suitably selected taking the relation to the outer diameter of the light-transmitting fiber into consideration, for instance, within a range of from 100 to 500 μm. There is no particular restriction as to the method for the formation of the clad. Immediately after the spinning of quartz glass or optical glass as the core, the coating composition for cladding may be coated or impregnated, followed by curing by e.g. heating to obtain a cured body. The core-clad structured fiber thus obtained, is usually further coated with a protective coating layer to obtain a final form of PCF. Nylon, a thermoplastic fluororesin, acryl urethane and epoxy urethane are suitable as the material for such a coating layer. However, the material for the coating layer is not restricted to such specific examples. Further, a cushioning layer may be provided between the clad layer and the coating layer for stress relaxation.

PCF of the present invention thus obtained has an advantage such that a solvent-soluble fluorine-containing polymer is coated as a cladding material on a core of quartz glass or optical glass, whereby uniform coating can readily be accomplished to obtain good adhesion. Further, the cured body obtained by the curing treatment has high bonding strength with an adhesive at the connector portion, whereby the possibility of the above-mentioned pistoning of the fiber can be minimized, and the water resistance is excellent. Thus, PCF of the present invention has excellent light-transmitting properties.

Now, the present invention will be described with reference to the Examples. However, it should be understood that the present invention is by no means restricted to such specific Examples.

EXAMPLE 1

A uniform coating composition for cladding was prepared by adding 7 parts by weight of methylated melamine ("Simel 303", manufactured by Mitsui Toatsu Co., Ltd.) and 0.5 part of p-toluene sulfonic acid as a catalyst to a solution obtained by dissolving in 80 parts by weight of methyl ethyl ketone, 100 parts by weight of a fluorine-containing polymer which was a three component copolymer comprising chlorotrifluoroethylene, ethyl vinyl ether and hydroxybutyl vinyl ether with a weight ratio of chlorotrifluoroethylene/ethyl vinyl ether/hydroxybutyl vinyl ether of 61.3/28.4/10.3 and which had a intrinsic viscosity of 0.10 dl/g as measured at 30° C. in tetrahydrofuran.

Then, this composition was coated on a fiber immediately after the fiber was spun from a quartz glass material into a diameter of 200 μm, and cured by passing the coated fiber in a heating furnace at a temperature of about 300° C. in one second, to form a clad layer of a cured body having a thickness of 10 μm, whereby a core fiber having a core-clad structure was obtained. This core fiber was coated with nylon ("N-1940, manufactured by Dycel) by melt-extrusion to form a coating layer, whereby PCF having an outer diameter of 0.9 mm was obtained.

The optical properties of this PCF were measured, whereby the transmission attenuation (850 nm) was 7 dB/km, and NA was 0.15. This PCF and a connector were bonded with an epoxy resin, and subjected to a heat cycle test within a range of from −20° C. to +80° C., whereby no pistoning of the fiber was observed. Further, for the water resistance test, PCF was immersed in warm water of 80° C. for 200 hours, and then the tensile strength of PCF was measured with respect to 20 fibers having a length of 7 mm, whereby the maximum tensile strength was 500 kg/mm$^2$ and the average was 450 kg/mm$^2$.

The refractive index nD of the fluorine-containing polymer as the clad was 1.449.

EXAMPLE 2

In the same manner as in Example 1, a coating composition for cladding was prepared by using a fluorine-containing polymer which was a three-component copolymer comprising tetrafluoroethylene, ethyl vinyl ether and hydroxybutyl vinyl ether with a weight ratio of tetrafluoroethylene/ethyl vinyl ether/hydroxybutyl vinyl ether of 60.8/29.5/9.7 and which had an intrinsic viscosity of 0.20 dl/g as measured at 30° C. in tetrahydrofuran.

In the same manner as in Example 1, this composition was coated on a quartz glass fiber and cured to form a cured body, whereby a core fiber with a clad layer having a thickness of 10 μm was obtained. This core fiber was coated with an ethylene-tetrafluoroethylene copolymer ("AFLON COP", manufactured by Asahi Glass Co., Ltd.) by melt-extrusion to form a coating layer, whereby PCF having an outer diameter of 0.6 mm was obtained.

The optical properties of this PCF were measured, whereby the transmission loss (850 nm) was 5 dB/km, and NA was 0.35. This PCF and a connector were bonded with an epoxy resin, and subjected to a heat cycle test in the same manner as in Example 1, whereby no protrusion of the fiber was observed. Further, in the water resistance test conducted in the same manner as in Example 1, the maximum tensile strength was 550 kg/mm$^2$, and the average was 480 kg/mm$^2$.

The refractive index nD of the fluorine-containing polymer as the clad was 1.412.

EXAMPLE 3

A uniform coating composition for cladding was prepared by adding 0.2 part by weight of a perfluoroalkyl group-containing non-ionic surfactant ("FC-430", manufactured by Sumitomo 3M Co.) as a surfactant and 4 parts by weight of mercapto propyl trimethoxy silane (manufactured by Union Carbide Co.) as a silane coupling agent to a solution obtained by dissolving 100 parts of the same fluorine-containing polymer as used in Example 1 in 80 parts by weight of methyl ethyl ketone and 20 parts by weight of methyl isobutyl ketone. The contact angle of this composition to a quartz glass was 35°. The contact angle prior to the addition of the surfactant, etc. was 50°.

Then, in the same manner as in Example 1, this composition was coated on a quartz glass fiber and cured to form a cured body, whereby a core fiber with a clad layer having a thickness of 10 μm was obtained. This core fiber was coated with nylon to form a nylon coating layer in the same manner as in Example 1, whereby PCF having an outer diameter of 0.9 mm was obtained.

The transmission loss (850 nm) of this PCF was 7 dB/km, and NA was 0.15. In the tensile strength measurement conducted in the same manner as in Example 1, this PCF showed the maximum tensile strength of 580 kg/mm$^2$ and the average tensile strength of 500 kg/mm$^2$.

EXAMPLE 4

A uniform coating composition for cladding was prepared by adding 0.25 part by weight of a perfluoroalkyl group-containing non-ionic surfactant ("FC-430", manufactured by Sumitomo 3M Co.) as a surfactant and 5 parts by weight of vinyl triethoxy silane ("A 171", manufactured by Union Carbide Co.) as a silane coupling agent to a solution obtained by dissolving 100 parts by weight of the same fluorine-containing polymer as used in Example 2 in 120 parts by weight of methyl ethyl ketone and 30 parts by weight of methyl isobutyl ketone. The contact angle of this composition to a quartz glass was 25°. The contact angle prior to the addition of the surfactant, etc. was 45°.

Then, in the same manner as in Example 1, this composition was coated on a quartz glass fiber and cured to obtain a cured body, whereby a core fiber having a clad layer having a thickness of 10 μm, was obtained. This core fiber was coated with nylon to form a coating layer in the same manner as in Example 1, whereby PCF having an outer diameter of 0.9 mm was obtained.

The transmission loss (850 nm) of this PCF was 5 dB/km, and NA was 0.37. In the tensile strength measurement conducted in the same manner as in Example 1, this PCF showed the maximum tensile strength of 600 kg/mm$^2$ and the average tensile strength of 550 kg/mm$^2$.

EXAMPLE 5

A coating composition for cladding having the same composition as in Example 4 was prepared.

In the same manner as in Example 1, this coating composition was coated on a quartz glass fiber and cured to form a clad layer having a thickness of 10 μm. Then, dimethyl silicone ("OF 106", manufactured by Shinetsu Chemical Co., Ltd.) was coated thereon and cured to form a cured body, whereby a core fiber with a cushioning layer having a thickness of 90 μm was obtained. This core fiber was coated with nylon ("N-1940", manufactured by Dycel) by melt-extrusion to form a coating layer, whereby PCF having an outer diameter of 0.9 mm was obtained.

The optical properties of this PCF were measured, whereby the transmission attenuation (850 mm) was 4.5 dB/km, and NA was 0.37. The increase in the transmission attenuation when this fiber was subjected to a low temperature of −40° C., was as small as 1.8 dB/km as compared with the transmission attenuation at 25° C. This PCF showed the maximum tensile strength of 600 kg/mm² and the average tensile strength of 550 kg/mm².

COMPARATIVE EXAMPLE

In the same manner as in Example 1, dimethyl silicone ("OF 106", manufactured by Shinetsu Chemical Co., Ltd.) was applied immediately after spinning a fiber from a quartz glass material into a diameter of 200 μm, and cured by passing it through a heating furnace at a temperature of about 400° C. for 1 second to obtain a core fiber with a clad layer having a thickness of 50 μm. This core fiber was coated with nylon by melt extrusion to form a coating layer, whereby PCF having an outer diameter of 0.9 mm was obtained.

The optical properties of this PCF were measured, whereby the transmission loss (850 nm) was 5 dB/km, and NA was 0.39. In the same manner as in Example 1, this PCF and a connector were bonded, and then subjected to a heat cycle test, whereby a pistoning at a level of from 50 to 1,000 μm, was observed. Further, in the water resistant test in the same manner as in Example 1, the tensile strength of PCF was about 100 kg/mm².

The refractive index nD of dimethyl silicone as a clad was 1.410.

The plastic-clad light-transmitting fiber of the present invention has a clad layer made of a cured body of a specific fluoroolefin polymer, and has a low transmission loss and an excellent effect that the protrusion of the fiber at the connecting portion with a connector hardly takes place.

In general, if a glass fiber has micro cracks on its surface, stress is concentrated at such a portion, and degradation due to moisture proceeds from such a portion. Therefore, for the plastic-clad light-transmitting fiber, the accumulation of a moisture or hydroxyl groups on the fiber with a core of quartz glass, must be avoided, and a cladding material having low moisture permeability is preferred. The cured body of a fluorine-containing polymer for the clad layer in the present invention, has poor affinity to moisture and is free from phenomena such as wetting with and penetration of moisture at the surface. Thus, it has an excellent effect that even when used in an adverse environmental condition, for instance, in the case of its outdoor use, it shows no deterioration in the strength.

Further, it has an advantage that NA can optionally be selected within a range of from 0.1 to 0.4 by adjusting the fluorine content in the cladding material. Moreover, the thickness of the clad layer can be controlled by adjusting the solid content in the coating composition for cladding, whereby it is possible to readily form a thin clad layer of from 5 to 10 μm. Furthermore, it is possible to improve the mechanical strength as PCF by an addition of a surfactant ad/or a silane coupling agent.

We claim:

1. A plastic-clad light-transmitting fiber consisting essentially of a core of quartz glass or optical glass and a clad of plastic material, characterized in that said clad of plastic material is a cured product obtained by curing a solvent-soluble copolymer of a fluoroolefin with an alkyl vinyl ether having curable sites and containing at least 10% by weight of fluorine based on the fluoroolefin units.

2. The plastic-clad light-transmitting fiber according to claim 1, wherein said curable sites are at least one kind of curable sites selected from the group consisting of hydroxyl groups, epoxy groups, carboxyl groups, acid amide groups, ester groups, unsaturated bonds, active hydrogen atoms and halogen atoms.

3. The plastic-clad light-transmitting fiber according to claim 1, wherein said solvent-soluble copolymer having curable sites is a copolymer of a fluoroolefin with an alkyl vinyl ether and comprises from 30 to 70 mol % of the fluoroolefin unit and from 30 to 70 mol % of the vinyl ether unit, and the polymer further contains not more than 30 mol % of a hydroxyalkyl vinyl ether unit or a glycidyl vinyl ether unit.

4. The plastic-clad light-transmitting fiber according to claim 1, wherein the clad of plastic material is a cured body of composition comprising a solvent-soluble fluoroolefin polymer having curable sites and a surfactant and/or a silane coupling agent.

5. The plastic-clad light-transmitting fiber according to claim 4, wherein the composition for the clad contains both the surfactant and the silane coupling agent, and the contact angle to the glass is not higher than 40°.

6. The plastic-clad light-transmitting fiber according to claim 4, wherein the composition for the clad contains from 0.01 to 1% by weight of the surfactant.

7. The plastic-clad light-transmitting fiber according to claim 4, wherein the composition for the clad contains from 0.1 to 10% by weight of the silane coupling agent.

8. The plastic-clad light-transmitting fiber according to claim 1, wherein the clad has a thickness of at most 15 μm, and is provided thereon with a cushioning layer to attenuate an external stress.

9. The plastic-clad light-transmitting fiber according to claim 1, wherein the clad of plastic material is a copolymer of a fluoroolefin having a refractive index not higher than 1.45.

* * * * *